United States Patent [19]

Luce

[11] Patent Number: 5,717,586
[45] Date of Patent: Feb. 10, 1998

[54] SINGLE WINDING POWER CONVERTER

[76] Inventor: John W. Luce, 1030 S. Sterling Ave., Tampa, Fla. 33629

[21] Appl. No.: 705,554

[22] Filed: Aug. 29, 1996

Related U.S. Application Data

[63] Continuation-in-part of Ser. No. 287,489, Aug. 8, 1994, abandoned.

[51] Int. Cl.$^6$ .................................................. H02M 1/12
[52] U.S. Cl. .................... 363/140; 363/39; 363/2; 363/64; 363/123; 363/106; 363/129
[58] Field of Search .................................. 363/45, 39, 125, 363/126, 2, 127, 64, 128, 123, 129, 131, 132, 140, 137, 109, 106

[56] References Cited

U.S. PATENT DOCUMENTS

| | | | |
|---|---|---|---|
| 4,366,532 | 12/1982 | Rosa et al. | 363/45 |
| 4,683,527 | 7/1987 | Rosa | 363/126 |
| 4,870,558 | 9/1989 | Luce | 363/87 |
| 5,068,774 | 11/1991 | Rosa | 363/129 |

Primary Examiner—Peter S. Wong
Assistant Examiner—Shawn Riley
Attorney, Agent, or Firm—David Kiewit

[57] ABSTRACT

The present invention provides smooth conversion of electric power between an AC line operating at a first voltage and a DC line operating at a second voltage bearing a fixed ratio to the first voltage. In one embodiment, polyphase AC is converted to rippled DC. In one embodiment, switched DC is converted to AC of one or more phases. The electric power converter of the invention uses a single electrical winding can be thought of as derived from the formerly well-known, and now largely forgotten, synchronous converter by locking the rotor, discarding the field winding and its power supply, replacing the AC slip ring contacts with hardwired connections, and replacing the DC commutator taps, bars and brushes with rectifying taps. Thus, the new power converter may be referred to as a single-winding static synchronous converter.

13 Claims, 6 Drawing Sheets

SINGLE WINDING POWER CONVERTER

CROSS REFERENCE TO RELATED APPLICATIONS

This application is a continuation-in-part of the inventor's Ser. No. 08/287,489, filed Aug. 8, 1994, now abandoned

BACKGROUND OF THE INVENTION

1. Field of the Invention

This invention relates to conversion between alternating current electric power and direct current electric power.

2. Description of Prior Art

Electrical power is commonly generated and distributed as polyphase alternating current. Some uses of electrical power require direct current (e.g., large scale industrial electrolytic processes, charging storage batteries, etc.). This need has long been served by a variety of power conversion apparatuses and methods.

The process of converting AC to DC electrical power was once entirely done with rotating electromechanical equipment, such as a motor-generator set in which an AC motor turns a DC generator. Synchronous converters, which combine the motor and generator functions in a single machine, became the preferred method of large scale AC to DC conversion early in the twentieth century. Both the motor-generator and synchronous converter have substantial efficiency losses due to friction, windage and fields. Moreover, both required regular lubrication and replacement of worn rotating contacts. Both the motor-generator set and the synchronous converter, however, took power from their AC inputs smoothly and supplied a smooth DC output current.

A variety of rectification devices have largely supplanted rotating electromechanical converters and offer higher conversion efficiency, lower initial cost, and freedom from regular maintenance. Conventional rectifying converters are non-linear AC loads that do not convert AC to DC smoothly, but instead take current pulses from an AC input and emit pulsed DC. The harmonic distortion (i.e., the difference between a pulsed waveform and a sine wave) that they induce on the input power grid provides significant disruption. Distortion can overheat wiring and transformers, cause erroneous operation of protective equipment, and disrupt operation of computers and other sensitive equipment.

Numerous approaches are known to reduce the harmonic distortion of AC to DC rectifying power converters. All of these add considerable cost and complexity to the overall equipment and diminish both its reliability and its efficiency. Many of these approaches are not desirable because their effectiveness varies with the load.

In U.S. Pat. No. 4,870,558 the inventor taught an electric power converter that substantially reduces harmonic distortion while providing a smooth and uniform conversion of AC to DC, or DC to AC. The method and apparatus taught in U.S. Pat. No. 4,870,558 uses a polyphase AC input current in a first set of windings to create a rotating magnetic field that in turn induces a current in a stationary second set of windings. Diodes in the secondary windings provide a DC output current with a ripple that is a function of the number of coils or connections in the secondary. Alternately, U.S. Pat. No. 4,870,558 provides a DC to AC converter comprising a plurality of primary windings, each of which incorporates an electronic switch (e.g., a GTO thyristor) driven at a desired frequency by a control circuit. The apparatus of U.S. Pat. No. 4,870,558, has been referred to as a "rotating field transformer", and is distinguished from conventional transformer art not only by its rotating field, but also by the fact that it may be made with any number of pairs of magnetic poles. Conventional transformers are strictly two pole machines and operate with an oscillating magnetic flux that neither translates nor rotates. The teaching of U.S. Pat. No. 4,870,558 is herein incorporated by reference.

SUMMARY OF THE INVENTION

The present invention provides smooth conversion of electric power between an AC line operating at a first voltage and a DC line operating at a second voltage bearing a fixed ratio to the first voltage. In one embodiment, polyphase AC is converted to rippled DC. In another embodiment, switched DC is converted to AC of one or more phases.

It is an object of the invention to provide a highly efficient means of converting between polyphase AC and DC currents.

It is an additional object of the invention to provide a means of converting between AC and DC electric power with a minimum of harmonic distortion. It is a further specific object of the invention to provide means satisfying distortion requirements of IEEE-519 and MIL-STD-1399 standards.

It is yet an additional object of the invention to provide a means of converting between polyphase AC and DC current that is both energetically efficient and that produces little harmonic distortion.

It is a further object of the invention to provide apparatus for converting polyphase AC to DC where the apparatus presents a balanced, high power factor load to the input AC line regardless of variations in the DC load.

It is yet a further object of the invention to provide apparatus for converting switched DC current to AC current having little harmonic distortion.

DESCRIPTION OF THE PREFERRED EMBODIMENT

The electric power converter of the invention can be thought of as derived from the formerly well-known, and now largely forgotten, synchronous converter by locking the rotor, discarding the field winding and its power supply, replacing the AC slip ring contacts with hardwired connections, and replacing the DC commutator taps, bars and brushes with rectifying taps. Thus, the new power converter may be referred to as a single-winding static synchronous converter. "Rectifying tap", as used hereinafter and as designated in the drawing with the reference numeral 30, denotes means connecting a winding 26 to either the positive 42 or to the negative side 40 of a DC circuit, the means comprising both a rectifying element 36 and a metallic connection 25 to the winding 26. This metallic connection to the winding 26 is hereinafter referred to as a "tap connection" and is denoted in the drawing with the reference numeral 25 to distinguish it from a metallic connection of the AC circuit to the winding 26, which is denoted in the drawing with the reference numeral 24. A single tap connection 25 may be shared by two rectifying taps 30 (e.g., as depicted in FIG. 1), but a rectifying element 36 is never shared between two rectifying taps 30.

Figure 1:
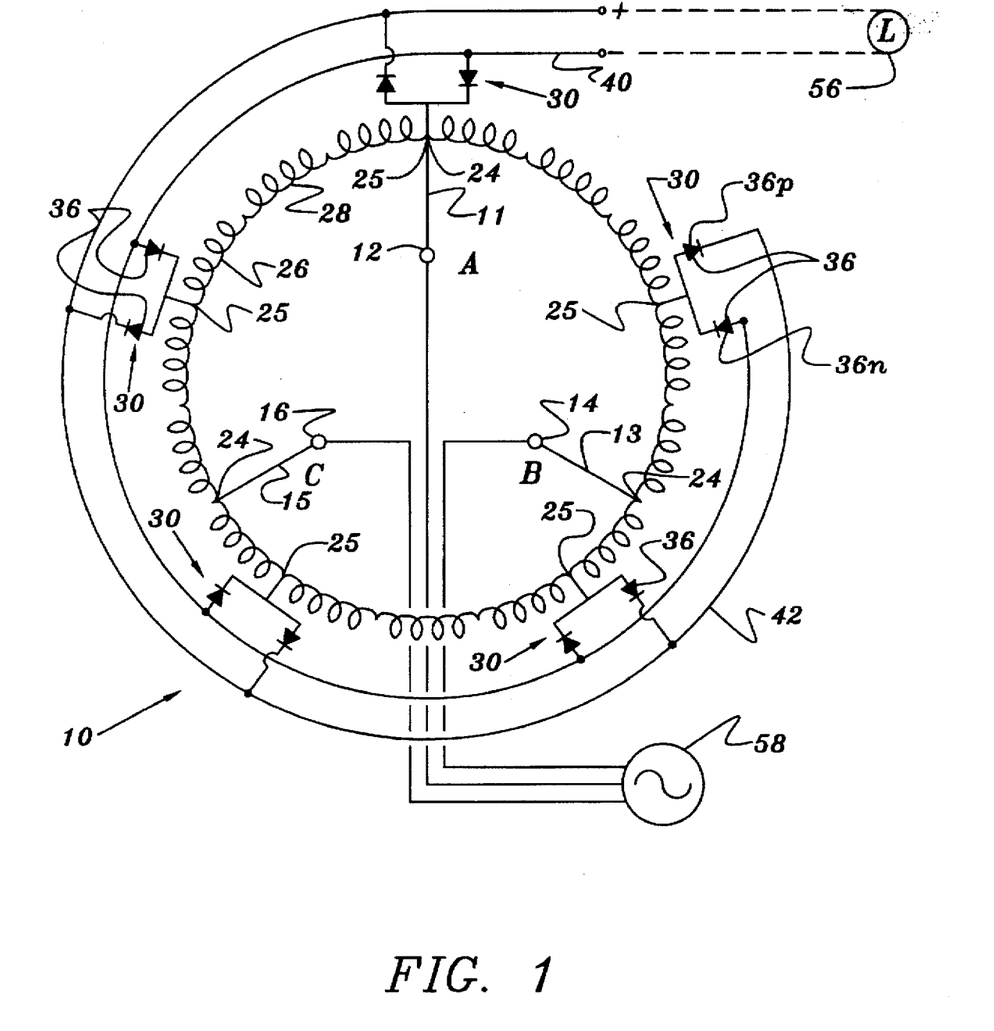
FIG. 1 is a schematic diagram of a preferred embodiment of AC to DC electric power conversion apparatus of the invention.

Turning initially to FIG. 1 of the drawing one finds a schematic diagram of a preferred AC to DC electric power converter 10 of the invention in which three input phase conductors 11, 13, 15 are connected to AC terminals 12, 14, 16 of the converter 10. (These terminals 12, 14, 16 and conductors 11, 13, 15 are also labeled with the conventional phase designations A, B, and C). The input terminals 12, 14, 16 are connected at evenly spaced points 24 (i.e., at every fifth coil 28) in the three-phase delta arrangement of FIG. 1 (or, more generally, in a polyphase mesh scheme) along a single winding 26. In FIG. 1 the single winding 26 is depicted as being made up of fifteen identical coils 28, although it will be clear from the ensuing discussion that various other choices could be made for the number of coils 28. Rectifying taps 30 are also evenly spaced along the single winding 26. In the preferred embodiment depicted in FIG. 1, the rectifying taps 30 are arrayed in a pair-wise fashion wherein each pair of rectifying elements 36 share a single tap connection 25 to the winding 26. When a pair of rectifying elements 36 shares a single metallic connection 25, a preferred design employs an odd number of tap connections 25 per pair of magnetic poles or, equivalently, per $2\pi$ of electrical phase angle (e.g., in the depiction of FIG. 1, the five tap connections 25 are spaced at every third coil 28 of the fifteen coil winding 26).

Figure 7:
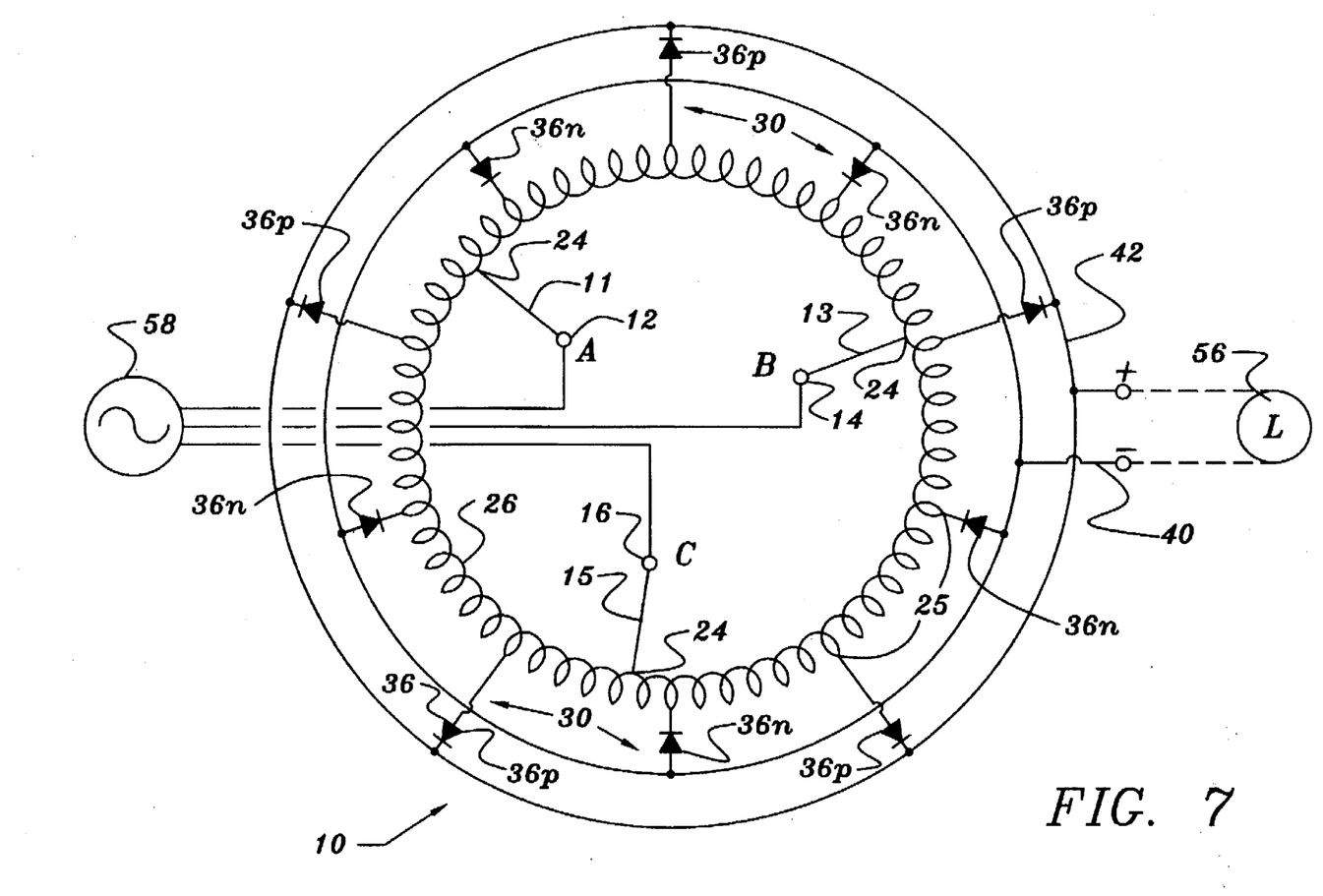
FIG. 7 is a schematic diagram of another embodiment of an AC to DC electric power conversion apparatus of the invention.

It is noteworthy in the foregoing that the "even spacing" of AC connections 24 and rectifying taps 30 refers to spacing within a period of $2\pi$ in electrical phase angle, which is the same as $2\pi$ of arc in FIG. 1 and FIG. 7 only for a two-pole version of the apparatus. As is clear to those skilled in the art, in a four-pole version of the apparatus of the invention, $2\pi$ of arc in FIG. 1 or FIG. 7 would correspond to an electrical phase angle change of $4\pi$, etc.

Figure 4:
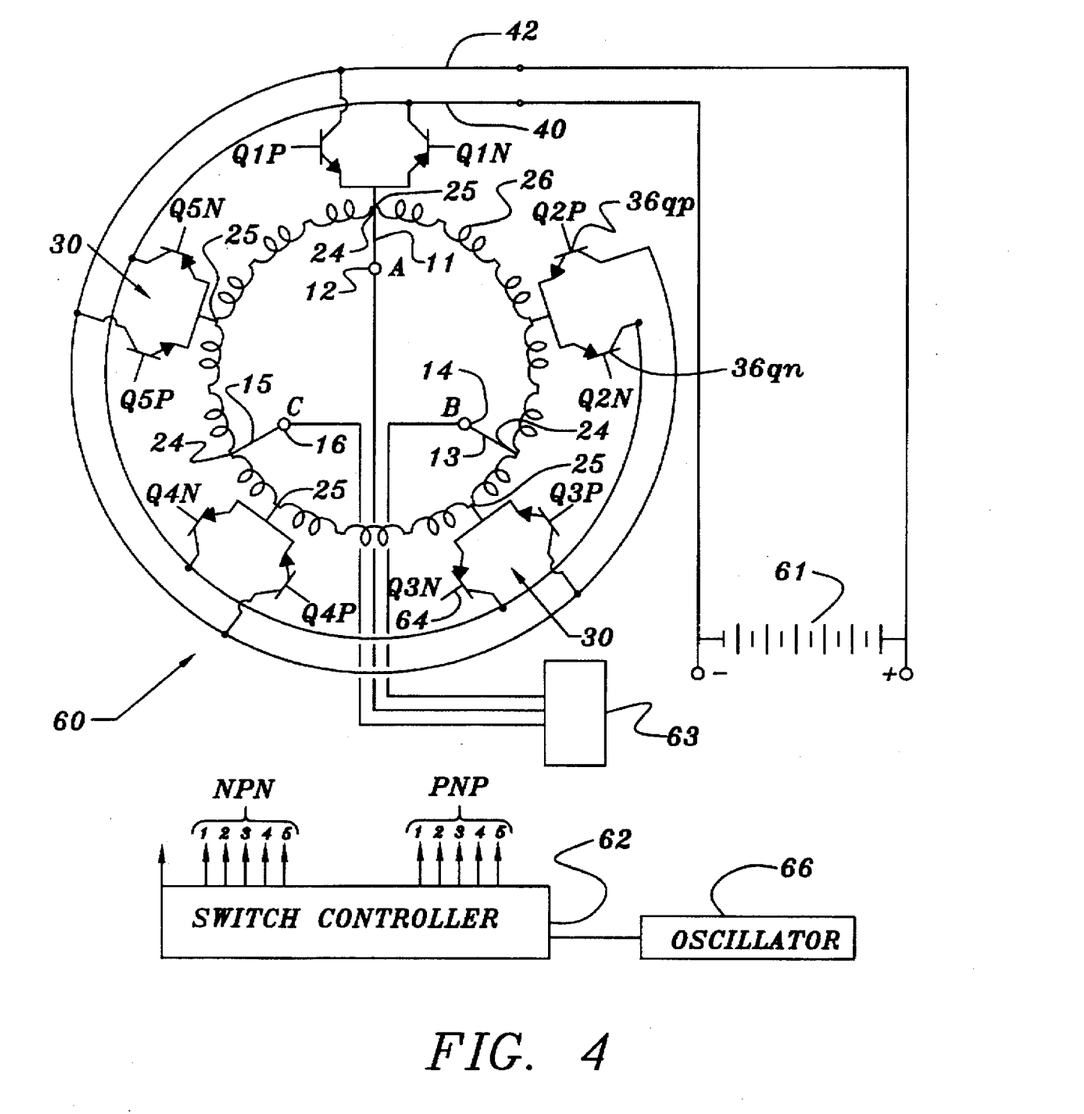
FIG. 4 is a schematic diagram of apparatus of an embodiment of the invention configured for the conversion of DC power to three-phase AC power.

Although an AC to DC converter 10 of the invention could have been made sixty years ago by employing the then new mercury arc rectifier as the rectifying element 36, a preferred rectifying element 36 comprises a solid state device having at least one rectifying junction and two or more terminals. Each such rectifying element has a conducting and a non-conducting state, and may have a finite transition region between those states. The rectifying junction, as is well known in the art, can be connected between a relatively positive and a relatively negative electrical potential in either a conducting sense or a non-conducting sense. In an AC to DC converter 10 embodiment of the invention the preferred rectifying elements 36 are diodes 36n, 36p. In another embodiment 60, configured for DC to AC conversion, the rectifying elements 36 are responsive to an output from a controller 62 to switch from a conducting to a non-conducting state. As depicted in FIG. 4, the controllable rectifying elements 36 for a DC to AC converter of the invention may be transistors 36qn, 36qp, that can be switched between their conducting and non-conducting states by applying a control signal to their respective base terminals 64.

In the AC to DC converters 10 depicted in FIG. 1 and FIG. 7 of the drawing the rectifying elements are diodes 36n, 36p. The half of the diodes denoted with the reference character 36n are connected to conduct current to the winding 26 from a negative DC bus 40 when the point 25 at which one of them is connected to the winding 26 is sufficiently negative with respect to the positive bus 42. Correspondingly, each of the other half of the diodes 36p conducts current from the winding 26 to a positive bus 42 when the point 25 at which it is connected to the winding 26 is sufficiently positive with respect to the negative bus 40 of the DC circuit. That is, at any instant power is delivered to the DC circuit from that negative diode 36n associated with the then most negative rectifying tap 30 and from that positive diode 36p associated with the then most positive rectifying tap 30. In the particular case of an apparatus 10 having an even number of rectifying taps 30 (e.g., as depicted in FIG. 7), the two conducting diodes 36n, 36p are $\pi$ electrical radians apart. As will subsequently be discussed herein with particular reference to FIG. 4 and 5 of the drawing an apparatus 60 of the invention can also be made in which the rectifying elements 36 are three terminal devices 36qn and 36qp that are sequentially switched to permit conversion of electric power from a DC input to an AC output.

When three phase AC power is applied from a source thereof 58 to the three AC terminals 12, 14, 16 of the AC to DC converter 10, a moving magnetic field of constant flux is set up. In the depiction of FIGS. 1 and 7 the moving field rotates at a constant angular velocity, which is conventionally referred to as the synchronous speed. As this field rotates it cuts the conductors of the winding 26 and induces therein an electromotive force (conventionally called a counter EMF, or a self-inductive EMF) of a polarity opposite to the applied AC voltage and nearly equal to it. This induced EMF also appears sequentially at each of the equally spaced taps 30 connected respectively to DC output diodes 36n, 36p. At any instant, one of the positive output diodes 36p experiences an induced EMF that is more positive than that experienced by any other positive output diode 36p and therefore connects this induced positive EMF to the positive output bus 42. A corresponding situation obtains for the negative diodes 36n and the negative output bus 40. Thus, for a chosen positive integer N, in a converter 10 having N rectifying taps 30 and 2N rectifying elements 36 (e.g., as depicted in FIG. 1), each of the negative diodes 36n and each of the positive diodes 36p conducts for 1/N th of each rotational period of the magnetic field. Moreover, if the converter 10 comprises 2N rectifying taps 30, each comprising a single rectifying element 36 (e.g., the depiction of FIG. 7) each of these diodes 36 also conducts for 1/N th of each rotational period. The apparatus 10 of the invention is thus somewhat analogous to an autotransformer (although it is noted that the magnetic field in an autotransformer does not move, but rather oscillates in intensity) and could be called a rotating field autotransformer as well as being referred to as a static synchronous converter.

Figure 2:
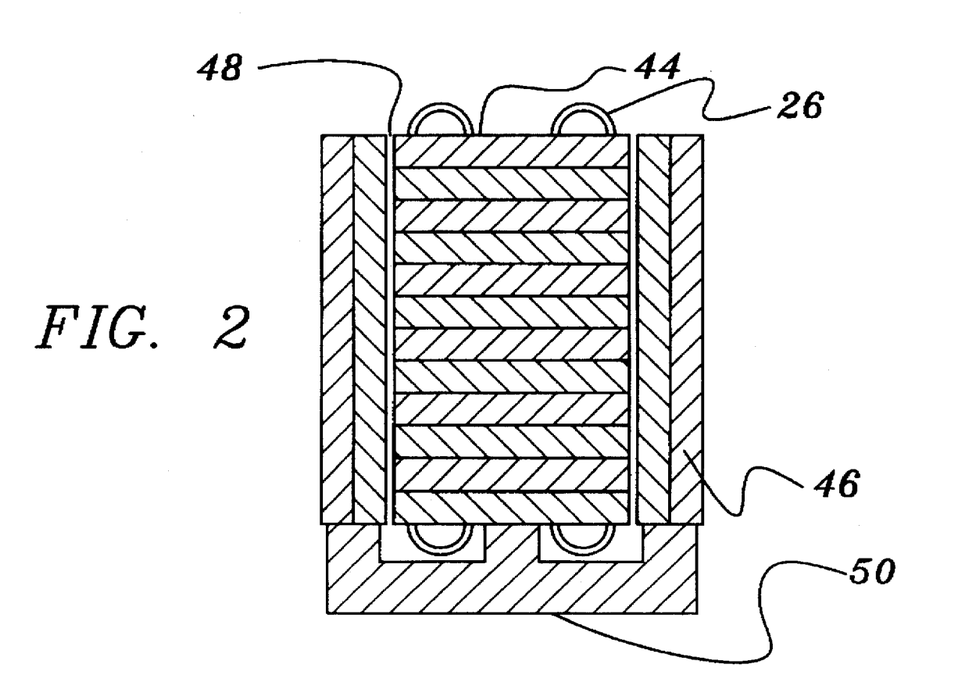
FIG. 2 is a schematic cross-sectional view of power conversion apparatus of the invention showing the single winding wound on the rotor core of a DC machine.

For apparatus used at conventional power line frequencies of fifty or sixty Hertz, the winding 26 is preferably wound on a convenient ferromagnetic body, such as the armature core 44 of a DC machine, as shown in FIG. 2 of the drawing. Moreover, a winding 26 on such a core is a conventional DC motor winding except for the various AC connections 12, 14, 16 and DC taps 30. The winding 26, like a DC motor winding, is preferably made on a generally cylindrical core comprising a plurality of ion laminations. Moreover, it may be prepared with any even number of poles, with the exact number being a matter of design choice, as is known in the art. Since there is only one winding 26 in the present apparatus, a magnetic return path can be provided in the machine of FIG. 2 by spiral-wrapping the wound core 44 with a sheet of iron to provide a laminated hollow cylindrical outer frame 46 that may be separated from the core 44 by an air gap 48. It will by understood by those skilled in the art that other well-known laminated iron structures (e.g., a stack of flat ion rings) could also be used for the outer frame 46. Because the core 44 and outer frame 46 do not move relative to each other (e.g., they may be attached to a common support 50) the air gap 48 may be eliminated (i.e., reduced to zero width).

Figure 3:
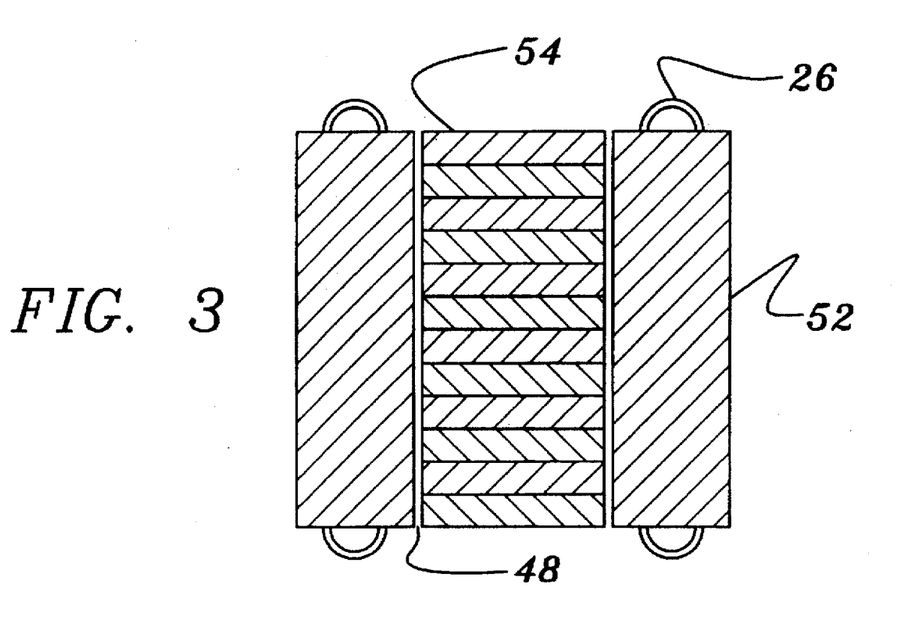
FIG. 3 is a schematic cross-sectional view of power conversion apparatus of the invention showing the single winding wound on the stator core of an AC machine.

Alternately, as shown in FIG. 3 of the drawing, the winding 26 may be disposed in a generally hollow cylindrical core such as a stator frame 52 of a known AC machine and provided with a suitable solid or laminated generally cylindrical core 54 in order to complete the magnetic circuit.

At higher frequencies, as is well known in the art of making inductive devices, losses may be reduced by making the winding 26 with a non-ferromagnetic core. At line frequencies often kHz or so, which are commonly used in contemporary motor controllers, a ferrite core may be preferred. At even higher frequencies the winding 26 may be prepared with an air core.

As is known for the conventional synchronous converter, there is a fixed ratio between the AC and DC sides of the apparatus 10, 60 of the invention. For conventional three phase input power the DC voltage is 1.633 times the AC voltage, just as is the case for the conventional synchronous converter.

It will be clear to those skilled in the art that the apparatus 10, 60 of the invention does not provide isolation between the AC and DC sides thereof. If such isolation is required, it can be added by known means, such as using an isolation transformer on the AC side of the converter, or by recourse to the methods and apparatus previously taught by the inventor in his U.S. Pat. No. 4,870,558.

Additionally, it will be appreciated that the self-inductance of the AC to DC converter 10 of the invention could cause a high voltage spike to occur at the DC output terminals if the load 56 or the supply 58 were suddenly interrupted. Known protective means, such as a shunting diode or capacitor on the DC terminals of the apparatus 10 (not shown), can be used to address this problem.

As noted above, the AC to DC converter 10 of the invention produces a rippled DC current from a polyphase AC input. The presence of a ripple on the output of the apparatus 10 implies there is a corresponding harmonic distortion induced on the AC input side. The total harmonic distortion (THD) has been calculated for a number configurations of possible converters and is compared with experimentally measured values in selected cases. The results of this work are presented in the following table:

| Number of tap connections | Number of Diodes | Ripples per cycle | Ripple amplitude % RMS | AC distortion, calculated % THD | AC distortion, measured % THD |
| --- | --- | --- | --- | --- | --- |
| 3 | 6 | 6 | 5.08 | 15.11 | 7.71 |
| 5 (FIG. 1) | 10 | 10 | 1.77 | 6.9 | 2.5 |
| 7 | 14 | 14 | 0.9 | 3.75 | 1.56 |
| 9 | 18 | 18 | 0.54 | 2.33 | 0.99 |
| 11 | 22 | 22 | 0.38 | 1.58 | — |
| 13 | 26 | 26 | 0.25 | 1.14 | — |

As shown in the foregoing table, the total harmonic distortion (THD) can be controlled by varying the number of rectifying taps 30 and can be brought within limits targeted by stringent standards, such as IEEE/ANSI STD. 519-1992 Paragraph 10.4; and MIL-STD-1399, Section 300A, Paragraph 5.2.8. Moreover, it is noteworthy that THD is minimized by providing an odd number of tap connectors 25, each of which is configured as depicted in FIG. 1 to be shared by a pair of rectifying elements 36. Similar results are found for converters with any number of pairs of magnetic poles—i.e., THD is minimized when there is an odd number of tap connectors 25, each of which is shared by a pair of rectifying elements 36, per pair of poles (or, alternately stated, per $2\pi$ of electrical phase angle).

Although a principal anticipated use of the apparatus of the invention is that of converting conventional three-phase alternating current electric power to direct current electric power, it will be understood to those skilled in the arc that any number of input phases greater than one may be used. That is, changing the three-phase, delta-connected input shown in FIG. 1 of the drawing to an N-phase, mesh-connected input produces an equivalent conversion of power from a polyphase alternating current circuit to power in a direct current circuit. The AC to DC converter 10 of the invention, however, does not work with a single phase AC input because a polyphase input is required to create the moving magnetic field on which the apparatus relies for its operation.

Turning now to FIG. 4 of the drawing one finds a DC to AC converter 60 supplying power from a DC source 61 to a conventional AC load 63 connected to the winding 26 by suitable phase conductors 11,13,15 attached to the three AC terminals 12, 14, 16 of the converter 60. This DC to AC converter 60 uses the same sort of winding 26 as the AC to DC converter 10. As discussed supra, the pairs of rectifying elements 36 in the DC to AC converter 60 are three terminal devices 36qn and 36qp (e.g., power transistors) that can be changed between a conducting and a non-conducting state by the application of a control signal supplied by a switch controller 62 to the third, control, terminal 64 of each rectifying element 36qn, 36qp. As indicated schematically in FIG. 4 of the drawing, the PNP power transistors 36qn (which are shown on the drawing with a number interposed between the "q" and the "n" to show the sequence of operation) and NPN power transistors 36qp (which are similarly labeled) are sequentially turned on and off by a switch controller 62 timed by an oscillator 66 to produce a current in the winding 26 that acts to induce an AC output current having the same frequency as that of the oscillator 66 and having a number of phases equal to the number of evenly spaced AC connections 24 to the winding 26. It will be noted that a minimum of three rectifying taps 30 must be made to the winding 26 in order to generate the requisite rotating magnetic field. On the other hand, any number of AC phases can be employed. This operation is similar to that disclosed in the inventor's earlier U.S. Pat. No. 4,870,558.

Figure 5:
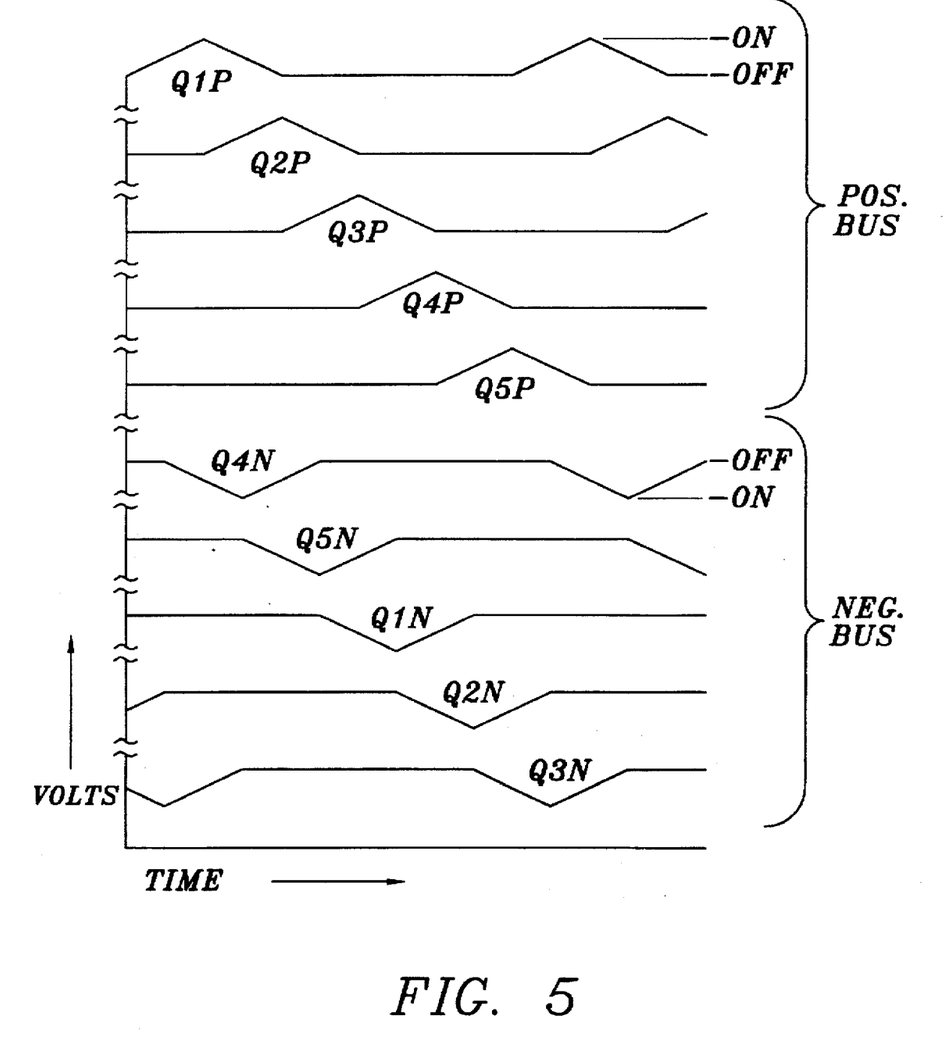
FIG. 5 is a timing diagram of the power transistors shown in FIG. 4.

In order to minimize harmonic distortion, a preferred switch controller 62 ensures that the various power transistors 36qn, 36qp conduct in accordance with the triangular wave forms shown in the timing diagram of FIG. 5 of the drawing. This timed conductance approach, as taught in U.S. Pat. No. 5,420,782, which names the present inventor and K. A. Buckle as joint inventors thereof, eliminates switching transients by gradually turning one rectifying element 36 on as another is being turned off. It will be understood that conventional square-wave switching waveforms (e.g., as taught in U.S. Pat. No. 4,870,558) will also provide DC to AC conversion from the apparatus of the invention, but with a greater harmonic distortion.

Figure 6:
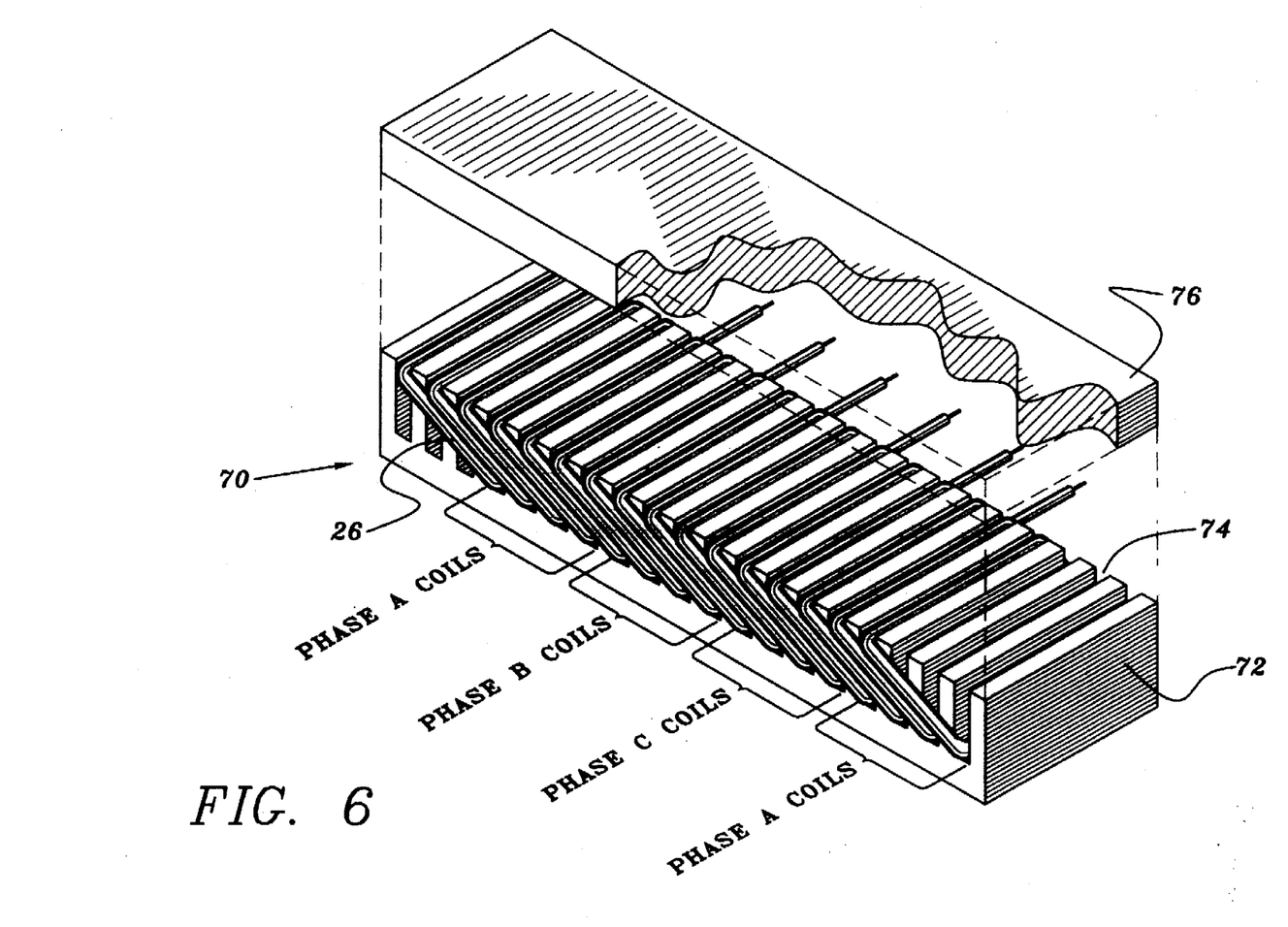
FIG. 6 is an exploded view of an electric converter of the invention manufactured in linear form.

Although it is expected that the greatest number of uses of the present invention will be found in designs using a single winding 26 adapted from an existing rotary AC or DC machine, in which the moving magnetic field is a rotating magnetic field, one could also make an AC to DC 10 or DC to AC 60 converter of the invention employing a linear winding configuration analogous to that shown in U.S. Pat. No. 4,870,558 and producing a magnetic field having a constant intensity that is translated along the axis of the winding. This is depicted in FIG. 6, where one finds a linear power converter 70 comprising an elongated ferromagnetic base 72 having a single winding 26 wound in a plurality of transverse slots 74, and a corresponding elongate ferromagnetic cover 76. The converter 70 of FIG. 6 is also analogous to a two-winding linear structure shown in the inventor's U.S. Pat. No. 4,870,558.

Although in the preferred embodiment of the AC to DC converter 10, depicted in FIG. 1, a single tap connection 25 to the winding 26 is shared by a pair of diodes 36n, 36p, it is also possible to associate each of the diodes 36n, 36p with a separate tap connection 25, as depicted in FIG. 7. The rectifying taps 30 depicted in FIG. 7 are evenly spaced along the winding 26, as were the rectifying taps 30 depicted in FIG. 1. For a given number of diodes 36, the design choice depicted in FIG. 7 requires twice as many tap connections 25 as the preferred embodiment 10 depicted in FIG. 1. Hence it is expected that the embodiment depicted in FIG. 7 would be somewhat more expensive to manufacture than would an otherwise comparable machine built in accordance with the depiction of FIG. 1.

Although the present invention has been described with respect to several embodiments, many modifications and alterations can be made without departing from the invention. Accordingly, it is intended that all such modifications and alterations be considered as within the spirit and scope of the invention as defined in the attached claims.

I claim:

1. Apparatus for converting between alternating current electric power in an alternating current circuit having a first predetermined number of phase conductors and direct current electric power in a direct current circuit having a positive side and a negative side, the apparatus comprising:

a single winding having the first predetermined number of AC connections evenly spaced therealong, each of the AC connections respectively connecting one of the phase conductors to the single winding;

a second, even, predetermined number of rectifying elements, each of the rectifying elements connected between the direct current circuit and one of a plurality of tap connections to the single winding, the tap connections evenly spaced along the single winding, a first half of the even predetermined number of rectifying elements connecting the positive side of the direct current circuit to the single winding, the second half of the even predetermined number of rectifying elements connecting the negative side of the direct current circuit to the single winding; and means generating a moving magnetic field having a constant flux, the moving magnetic field inducing an electromotive force in the winding.

2. The apparatus of claim 1 wherein the moving magnetic field comprises a rotating magnetic field.

3. The apparatus of claim 1 wherein the moving magnetic field comprises a linearly translated magnetic field.

4. Apparatus of claim 1 wherein the means of generating the moving magnetic field comprises a polyphase source of AC power and wherein the apparatus converts the electric power from the AC source to DC power in the DC circuit.

5. Apparatus of claim 1 wherein the means generating the moving magnetic field comprises a source of DC electric power and a controller, and wherein each of the rectifying elements comprises a controllable rectifying element switching between a conducting state and a non-conducting state responsive to the controller, whereby the apparatus converts DC electric power from the DC source thereof to AC electric power in the AC circuit.

6. A method of converting polyphase alternating current electric power in an alternating current circuit to direct current electric power in a direct current circuit, the method comprising the steps of:

a) producing a moving magnetic field having a constant flux by connecting each phase conductor of the polyphase alternating current circuit to a respective point on a single winding, the points spaced evenly along the winding;

b) magnetically coupling the single winding to the moving magnetic field to produce the direct current electric power in an output circuit connected to the single winding by a first predetermined number of tap connections evenly spaced along the single winding, each of the tap connections having one of a second even predetermined number of diodes respectively associated therewith, a first half of the second predetermined number of diodes connected to conduct the electric current from the single winding to a positive side of the direct current circuit, the second half of the second predetermined number of diodes connected to conduct the electric current from a negative side of the direct current circuit to the single winding.

7. The method of claim 6 wherein the moving magnetic field comprises a rotating magnetic field.

8. The method of claim 6 wherein the moving magnetic field comprises a linearly translated magnetic field.

9. The method of claim 6 wherein each of the tap connections has two diodes associated therewith, each of the two diodes a member of a separate one of the two halves of the second predetermined number of diodes, and wherein the second predetermined number is equal to twice the first predetermined number.

10. The method of claim 6 wherein the first predetermined number is equal to the second predetermined number.

11. A method of converting direct current electric power from a source thereof to alternating current electric power having a predetermined frequency and a predetermined number of phase conductors, each phase conductor conducting a respective phase, the method comprising the steps of:

a) respectively connecting each of the alternating current phase conductors to a single winding at one of the predetermined number of connection points evenly spaced along the single winding;

b) producing a moving magnetic field by sequentially turning on and off each of a plurality of rectifying elements connecting the direct current electric power source respectively to a plurality of evenly spaced tap connections on the single winding, the rectifying elements turned on and off at the predetermined frequency; and c) magnetically coupling the single winding to the moving magnetic field, thereby producing the alternating current electric power.

12. The method of claim 11 wherein the moving magnetic field comprises a rotating magnetic field.

13. The method of claim 11 wherein the moving magnetic field comprises a linearly translated magnetic field.

* * * * *